United States Patent
Tsunoo et al.

(10) Patent No.: US 8,374,351 B2
(45) Date of Patent: Feb. 12, 2013

(54) ENCRYPTION DEVICE, PROGRAM, AND METHOD

(75) Inventors: Yukiyasu Tsunoo, Tokyo (JP); Teruo Saito, Ishikawa (JP); Hiroyasu Kubo, Ishikawa (JP); Tomoyasu Suzaki, Ishikawa (JP)

(73) Assignee: NEC Corporation, Tokyo (JP)

( * ) Notice: Subject to any disclaimer, the term of this patent is extended or adjusted under 35 U.S.C. 154(b) by 1057 days.

(21) Appl. No.: 12/374,397

(22) PCT Filed: Jul. 11, 2007

(86) PCT No.: PCT/JP2007/063797
§ 371 (c)(1),
(2), (4) Date: Jan. 20, 2009

(87) PCT Pub. No.: WO2008/010441
PCT Pub. Date: Jan. 24, 2008

(65) Prior Publication Data
US 2009/0323956 A1    Dec. 31, 2009

(30) Foreign Application Priority Data

Jul. 21, 2006   (JP) ................................ 2006-199681

(51) Int. Cl.
*H04L 9/00* (2006.01)
(52) U.S. Cl. .......................................... 380/268; 726/36
(58) Field of Classification Search .................. 380/268, 380/46
See application file for complete search history.

(56) References Cited

U.S. PATENT DOCUMENTS

| | | | | |
|---|---|---|---|---|
| 5,297,207 A | * | 3/1994 | Degele | 380/46 |
| 5,345,508 A | * | 9/1994 | Lynn et al. | 380/46 |
| 7,424,131 B2 | * | 9/2008 | Alattar et al. | 382/100 |
| 2006/0039558 A1 | * | 2/2006 | Morii et al. | 380/46 |
| 2007/0230694 A1 | * | 10/2007 | Rose et al. | 380/46 |
| 2011/0216901 A1 | * | 9/2011 | Kiyomoto et al. | 380/46 |

OTHER PUBLICATIONS

Tong Xiao-jun; The Production Algorithm of Pseudo-Random Number Generator Based on Compound Non-Linear Chaos System; Year: 2006; IEEE; p. 685-688.*
International Preliminary Report on Patentability for PCT/JP2007/063797 mailed Feb. 5, 2009.
International Search Report for PCT/JP2007/063797 mailed Sep. 4, 2007.

(Continued)

*Primary Examiner* — Mohammad W Reza
*Assistant Examiner* — Monjour Rahim

(57) ABSTRACT

Disclosed is an encryption device for generating a pseudo-random number based on a secret key and generates an encrypted text by applying the pseudo-random number sequence to a plain text, uses, an internal state in accordance with a state based on a permutation of a sequence of a finite number of numeric values, as an internal state used for generation of the pseudo-random number sequence, executes a predetermined leftward or rightward rotate shift, depending on a number smaller than an internal state number, based on the result of linear or non-linear, or combination of linear and non-linear using one or more numeric values of the internal state and sets at least one temporary variable used for generation of the pseudo-random number sequence to be a temporary variable having as a value a result of the execution of the predetermined leftward or rightward rotate shift, and generates the pseudo-random number by a predetermined prescribed operation on one or a plurality of numeric values of the internal state and the temporary variable.

22 Claims, 17 Drawing Sheets

OTHER PUBLICATIONS

G. Gong, K. C. Gupta, M. Hell, and Y. Nawaz, "Towards a General RC4-Like Keystream Generator", SKLOIS Conference on Information Security and Cryptology, CISC 2005, LNCS 3822, pp. 162-174, Springer Verlag, 2005.

I. Mantin and A. Shamir: "A Practical Attack on Broadcast RC4,"Fast Software Encryption, FSE 2001, LNCS 2355, pp. 152-164, Springer-Verlag, 2001.

S. Paul, B. Preneel, and G. Sekar: "Distinguishing Attacks on the StreamCipher Py," eSTREAM, the ECRYPT Stream Cipher Project, Report 2005/081, 2005.

Wu, "Cryptanalysis of a 32-bit RC4-like Stream Cipher", Cryptology ePrint Archive, 2005/219, <URL: http://eprint.iacr.org/2005/219.pdf>.

Tsunoo et al. "The Most Efficient Distinguishing Attack on VMPC and RC4", eSTREAM, the ECRYPT Stream Cipher Project, 2005/37, <URL: http://www.ecrypt.eu.org/stream/papersdir/037.pdf>.

Russian Office Action for RU2009106061/09((008125) issued Apr. 27, 2010.

E. Biham et al., "Py: A Fast and Secure Stream Cipher using Rolling Arrays". Technion—Computer Science Department—Technical Report CS-2005-11-2005, Apr. 29, 2005, pp. 1-18.

V. Dorot et al., "Thesaurus of modern computer lexicon', the 3rd edition, Saint-Peter but press BHV-Petersburg", pp. 146, Year :2004.

* cited by examiner

FIG. 2   RELATED ART

32bit RC4 (CISC 2005)

KSA(K, S)
for i=0 to N-1
  S[i] = $a_i$
j = k = 0
Repeat r times
  for i = 0 to N-1
    j = (j + S[i] + K[i mod l]) mod N
    Swap(S[i], S[j])
    S[i] = S[i] + S[j] mod M
    k = k + S[i] mod M t = 0

PRGA(S)
i = 0
j = 0
while (1)
  i = (i + 1) mod N
  j = (j + S[i]) mod N
  k = (k + S[i]) mod M
  out = (S[(S[i] + S[j]) mod N] + k) mod M
  S[(S[i] + S[j]) mod N] = k + S[i] mod M

FIG. 4   RELATED ART

PRGA STATE TRANSITION (2)

|   | 0 | 1 | 2 |   | A |   | A+B |   | A+C |   | C+D |
|---|---|---|---|---|---|---|---|---|---|---|---|
| S |   | A | C | ... | B | ... | $k_0 + A + B$ | ... | D |   |   |

$\langle t=2 \rangle$ $i_2 = 1 + 1 = 2$ $j_2 = A + S[2] = A + C$ $k_2 = k_1 + S[A + C] = k_0 + B + D$ $O_2 = S[S[2] + S[A + C]] + k_2$
$\quad = S[C + D] + k_0 + B + D$ $S[C + D] = k_2 + S[2]$
$\quad = k_0 + B + C + D$ $k_0 + B + C + D$

FIG. 8  RELATED ART

PRGA ANALYSIS (4)

Lower 8 bits of continuous output are as below.

$O_1 = k_0$ $O_2 = \begin{cases} k_0 + 2A & \text{(condition 3)} \\ k_0 + 2 & \text{(condition 4)} \end{cases}$ Thus the following relationship is satisfied.

$\text{lsb}(O_1) = \text{lsb}(O_2)$

If this expression is a distinguisher, it is possible to distinguish between an output sequence of 32-bit RC4 and a true random number sequence.

FIG. 9

DATA AMOUNT NECESSARY FOR ATTACKING (THEORETICAL VALUE)

Assuming equal output with S-box entries uniformly random by initial processing, the following holds:

$p1 = 1/256$ $p2 = 255/256$ $p3 = 1/256 \cdot 1/256 + 255/256 \cdot 2/256 = 511/256^2$ In cases in which the condition is not satisfied, if the probability of the distinguisher holding true is 1/2, the probability of the distinguisher arbitrarily holding true is:

$\Pr\{lsb(O_1) = lsb(O_2)\}$ $= \Pr\{lsb(O_1) = lsb(O_2) \ ^{\text{condition}}_{\text{OK}}\} + \Pr\{lsb(O_1) = lsb(O_2) \ ^{\text{condition}}_{\text{NG}}\}$ $= p1 \cdot p2 \cdot p3 \cdot 1 + \{1 - p1 \cdot p2 \cdot p3\} \cdot 2^{-1}$ $= 2^{-1} \cdot (1 + 1/256 \times 255/256 \times 511/256^2)$ $\doteq 2^{-1} \cdot (1 + 2^{-15.008})$ The data amount necessary for attacking is theoretically as follows:

DATA AMOUNT NECESSARY FOR ATTACKING (EXPERIMENTAL VALUE)

Probability obtained by experiment is as follows:

$$p1 \cdot p2 \cdot p3 = 2^{-14.404}$$

In cases in which the condition is not satisfied, if the probability of the distinguisher holding true is 1/2, the probability of the distinguisher arbitrarily holding true is:

$$\Pr\{lsb(O_1) = lsb(O_2)\}$$
$$= \Pr\{lsb(O_1) = lsb(O_2) \mid \text{condition OK}\} + \Pr\{lsb(O_1) = lsb(O_2) \mid \text{condition NG}\}$$
$$= p1 \cdot p2 \cdot p3 \cdot 1 + \{1 - p1 \cdot p2 \cdot p3\} \cdot 2^{-1}$$
$$\fallingdotseq 2^{-1} \cdot (1 + 2^{-14.404})$$

The data amount necessary for attacking is experimentally as follows:

EXPERIMENTAL RESULT (distinguisher)

| DATA AMOUNT N | REJECTION RATE |
|---|---|
| $2^{24}$ | 42 % |
| $2^{25}$ | 53 % |
| $2^{26}$ | 45 % |
| $2^{27}$ | 67 % |
| $2^{28}$ | 85 % |
| $2^{29}$ | 96 % |

FIG. 12

ORIGINAL ALGORITHM

PRGA(S)
i = 0
j = 0
while (1)
   i = (i + 1) mod N
   j = (j + S[i]) mod N
   k = (k + S[j]) mod M
   out = (S[(S[i] + S[j]) mod N] + k) mod M
   S[(S[i] + S[j]) mod N] = k + S[i] mod M ($N = 2^n$, $M = 2^m$)

FIG. 13

MODIFIED ALGORITHM

PRGA(S)
i = 0
j = 0
while (1)
   i = (i + 1) mod N
   j = (j + S[i]) mod N
   k = ((k + S[j]) <<< n) mod M
   out = (S[(S[i] + S[j]) mod N] + k) mod M
   S[(S[i] + S[j]) mod N] = k + S[i] mod M ($N = 2^n, M = 2^m$)

FIG. 16

KSA(K, S)
for i=0 to N-1
   a[i] = i
j = k = 0
for r = 0 to 3
   for i = 0 to N-1
      j = (j + a[i] + K[i mod l]) mod N
      Swap(a[i], a[j])
      k = k + (a[i] <<< 8×r)
   for i = 0 to N-1
      S[i] = S[i] ⊕ (a[i] <<< 8×(3-r))

FIG. 17

PRGA(S)
i = 0
j = 0
while (1)
    i = (i + 1) mod N
    j = (j + (S[i] >>> 24)) mod N
    k = (k + (S[j] >>> 16)) mod M
    out = ((S[(S[i] + S[j]) mod N] >>> 8) + k) mod M
    S[(S[i] + S[j]) mod N] = k + S[i] mod M

ENCRYPTION DEVICE, PROGRAM, AND METHOD

REFERENCE TO RELATED APPLICATION

This application is the National Phase of PCT/JP2007/063797, filed Jul. 11, 2007, which claims the benefit of the priority of Japanese Patent Application No. 2006-199681 (filed on Jul. 21, 2006), the disclosure of which is incorporated herein in its entirety by reference thereto.

TECHNICAL FIELD

The present invention relates to an encryption device, a computer program, and a method for keeping data confidential when communicating or storing the data.

BACKGROUND ART

<Overview of Stream Cipher>

Ciphers are used as a technique for making data confidential. Among ciphers, in order to perform high speed encryption and decryption, there is a stream cipher which sequentially encrypts a plain text, by bit units, byte units, or the like. A typical stream cipher includes a key stream generator which generates a key stream, and a combination unit which combines the key stream and the plain text. For example, in encryption processing, with a secret key as a seed, a pseudo-random number is generated (key stream generator), and an XOR operation is performed on this pseudo-random number and the plain text (combination unit), to generate a cipher text. Here, XOR indicates an exclusive OR operation for each bit.

Assuming that the plain text is P, the pseudo-random number is R, and the cipher text is C, a relationship is as follows:

$$P \text{ XOR } R = C$$

In decryption processing, the plain text can be derived by generating a pseudo-random number from the same seed and performing an XOR operation on the cipher text.

The following relationship holds:

$$\begin{aligned} C \text{ XOR } R &= (P \text{ XOR } R) \text{ XOR } R \\ &= P \text{ XOR } (R \text{ XOR } R) \\ &= P \text{ XOR } 0 \\ &= P \end{aligned}$$

and the following is obtained:

$$C \text{ XOR } R = P$$

<Security of Stream Cipher>

In the stream cipher, the combination unit is often implemented by simple processing such as XOR or the like. As a result, the security of the stream cipher depends on security of the pseudo-random number generated by the key stream generator.

Here, the security of the pseudo-random number depends on a pseudo-random number sequence to be generated thereafter not being predictable from an already observed pseudo-random number sequence.

For example, if the key stream generator has generated a key stream with repetitions such as a, b, c, a, b, c, . . . , since the pseudo-random number sequence to be generated thereafter is predictable from the already observed pseudo-random number sequence, the cipher text will be decrypted. This is because it is possible to execute an inverse operation of the combination unit.

That is, if the pseudo-random number R is predicted, the cipher text C is observed, and by $$C \text{ XOR } R = P$$

it is possible to obtain the plain text P.

Giving consideration as in the above description, if the key stream generator generates a pseudo-random number that is not possible to predict, the stream cipher is secure. Stated in a reverse manner, if information can be found by which the pseudo-random number that is generated by the key stream generator can be distinguished from a true random number, it is possible to consider that security deteriorates in some way with respect to the stream cipher.

<Example of a Technique of Evaluating Security of a Stream Cipher>

There is a technique of evaluating the security of the stream cipher, based on the way of ideas described above. A technique of attack on a cipher in which an outputted cipher text or a pseudo-random number sequence is shown to be distinguished from a true random number sequence is referred to as a "distinguishing attack".

With respect to distinguishing from the true random number, if the outputted cipher text or the pseudo-random number sequence is shown to have some sort of bias or characteristic, it is determined that the distinguishing has been realized.

In a distinguishing attack, a means which shows this type of bias or characteristic is referred to as a "distinguisher", and discovering and creating the means in which this type of bias or characteristic is shown is referred to as a "constructing a distinguisher". If the distinguisher can be constructed, the distinguishing attack can be applied.

If a distinguishing attack can be applied to a certain cipher, since there is a possibility that this cipher will leak information concerning the plain text or key, it cannot be guaranteed that the cipher is secure.

Therefore, if an alteration is added to the cipher to which the distinguishing attack can be applied, and the distinguishing attack can no longer to applied, it may be considered that the security of the cipher has been improved.

<Specific Example of Stream Cipher>

RC4 is an encryption algorithm developed by Ron Rivest, and is a stream cipher that is widely used as an encryption standard, such as RFC2246 (TLS), WEP, WPA, and the like. A specification of the RC4 has been made public by RFC2246 (TLS) and the like.

The RC4 has a characteristic in that a processing unit of n bits is variable, but if the processing unit n is made large, memory requirement becomes 2n, and a key schedule becomes extremely slow.

As a result, in actuality, there have been few implementations in which n exceeds 8 bits, and implementations exceeding 32 bits have not been possible.

Therefore, with RC4, implementations applied to recent processor sizes such as 32-bit/64-bit processors have not been possible.

So that such limitations do not occur with a 32-bit RC4, improvements have been made to realize an algorithm that can be implemented with high speed and small memory on a 32-bit/64-bit processor, as described in a paper (Non-Patent Document 1) published by G. Gong et al. in 2005.

In Non-Patent Document 1, in cases of a processing unit of 32 bits, there are successful implementations in which speed is restricted to approximately 3.1 times that of RC4, and memory is restricted to approximately $2^{\{-22\}}$ that of RC4.

Furthermore, by adding an internal variable k, an improvement is made to an algorithm in which a vulnerability of RC4 reported in the past (a statistical bias) does not occur.

<Gist of Attack Technique which is Dealt with by the Invention>

In cases of the algorithm of G. Gong et al., it is possible to construct a distinguisher in which the least significant bits of continuous output must match.

According to this distinguisher, distinguishing of a true random number sequence with a data amount of approximately $2^{\{30\}}$ is possible.

<Description of Improved Algorithm Proposed by G. Gong et al., to Exemplify the Attack Technique>

FIG. 2 illustrates the improved RC4 algorithm (32-bit RC4) proposed by G. Gong et al. in Non-Patent Document 1. In an RC4 type of stream cipher proposed by G. Gong et al., the number of entries in an array S is $2^{\{n\}}$, and entry size of the array S is m bits.

Furthermore, in Non-Patent Document 1, since an initial constant ai of a KSA is defined only for a model with n=8 and m=32, in the present specification also, detailed analyses are also performed for a model with n=8 and m=32. Below, a description GGHN(n,m) is used for convenience, founded on basic processing units n and m.

As shown in FIG. 2, an RC4 type stream cipher GGHN(n, m) proposed by G. Gong et al., is configured of two processes KSA(K, S) and PRGA(S).

The KSA(K, S) performs a permutation of a 32-bit 256-element array, based on a key K of from 40 bits to 256 bits, being what is called an initial setting, and produces an initial state S.

The PRGA(S) is a process which generates a key stream, and generates a pseudo-random number at each point in time based on the state S.

Here, + represents mod N or mod M arithmetic addition, and $N=2^{\{8\}}$, and $M=2^{\{32\}}$. Furthermore, L represents the number of bytes of a secret key.

First, operation of the KSA(K, S) is described.

In the KSA, as initial values of the array S, by assigning an initial variable ai ($S[i]=a_i$), and repeating a swap of S entries (Swap[S[i], S[j]]) and arithmetic addition (S[i]=S[i]+S[j] mod M), the S entries are mixed around.

In the KSA, since the internal variable k is also initialized by an S entry (k=k+S[i] mod M) being used, an initial value of k for the PRGA is unknown.

In the mixing around of the S entries, the number of loops r is variable, but, so that the probability of appearance of the S entries is random, a determination is made so as to select r=20 when m=32. In the proposal of G. Gong et al., it is determined to set r=40 when m=64.

A state immediately after KSA(K, S) has finished, in which PRGA(S) has not been started, is at time t=0. When time t=0, operation of the KSA(K, S) finishes, and it is expected that the state of the array S is sufficiently mixed around by the secret key K.

Next, operation of the PRGA(S) is described.

In the PRGA, arithmetic addition is performed of the variable k and a reference result of the array S, (S[(S[i]+[j]) mod N]) based on indexes i and j; and 1 word (1 word=32 bits) is outputted as a key stream (out=S[(S[i]+S[j]) mod N]+k) mod M). Furthermore, the S entry (S[(S[i]+S[j]) mod N]) that is referred to in order to generate the key stream, is updated using k immediately after the key stream output, (S[(S[i]+S[j]) mod N]=k+S[i] mod M). In FIG. 2, out (=S[(S[i]+S[j]) mod N]=k+S[i] mod M) is the key stream which is output.

FIG. 3 illustrates operation (a state transition of the PRGA) at time t=1. In the array S, when a value S[1] of an address 1 is A, and a value S[A] of an address A is B, a value S[A+B] of an address A+B is k0+A+B.

FIG. 4 illustrates operation (a state transition of the PRGA) at time t=2. In the array S, when the value S[1] of the address 1 is A, the value S[A] of the address A is B, a value S[2] of an address 2 is C, a value S[A+C] of an address A+C is D, and a value S[A+B] of an address A+B is k0+A+B, a value S[C+D] of an address C+D is k0+B+C+D.

The security of the RC4 type stream cipher proposed by G. Gong et al. is reported in their paper (Non-Patent Document 1).

According to this, since the key stream is masked by arithmetic addition of the variable k at an S entry, if k is assumed to follow a uniform distribution according to KSA, it is shown that a bias does not occur in an output sequence.

Furthermore, the size of internal memory is 4 times that of RC4, and since S entries are updated by arithmetic addition, it is reported that security is improved also with respect to attacks seeking the internal memory.

However, if all S-box entries (elements of array S) and the variable k are even numbers at the same time, a "weak state" exists in which even numbers continue constantly thereafter. But, from the viewpoint of the size of the internal memory, since the probability of existence of the weak state is sufficiently small as to be considered not possible to occur, there is no problem with security.

[Non-Patent Document 1]
G. Gong, K. C. Gupta, M. Hell, and Y Nawaz, "Towards a General RC4-Like Keystream Generator", SKLOIS Conference on Information Security and Cryptology, CISC 2005, LNCS 3822, pp. 162-174, Springer Verlag, 2005.

[Non-Patent Document 2]
I. Mantin and A. Shamir: "A Practical Attack on Broadcast RC4," Fast Software Encryption, FSE 2001, LNCS 2355, pp. 152-164, Springer-Verlag, 2001.

[Non-Patent Document 3]
S. Paul, B. Preneel, and G. Sekar: "Distinguishing Attacks on the StreamCipher Py," eSTREAM, the ECRYPT Stream Cipher Project, Report 2005/081, 2005.

The entire disclosure of Non-Patent Documents 1 to 3 is incorporated herein by reference thereto. The following analysis is given by the present invention.

<Description of GGHN(n,m) Attack Technique, "Distinguishing Attack", that is an Object of the Invention>

With respect to analyzing GGHN(8, 32), a description is given concerning representation of variables and definitions.

The symbol · represents arithmetic multiplication.

The symbol || represents concatenation of data.

The expression X<<<n represents a leftward n bit rotate of data X.

Furthermore, with lsb(X) as the least significant bit of the data X, and LSB(X) as the least significant byte, $$\text{lsb}(X) = X \bmod 2$$

$$\text{LSB}(X) = X \bmod 2^{\{8\}}$$

At time t, variables i, j, and k are represented as it, jt, and kt.

Furthermore, at time t, an x-th S-box entry is represented as St[x].

The key stream outputted at time t is Ot, and the time at which a first key stream is outputted is t=1.

Here, an initial value of PRGA is defined as i0=0, and j0=0, and k0 is unknown.

Furthermore, regarding performing analyses, an attacker can freely obtain the key stream.

<Bias Between a First Output Word and a Second Output Word>

First, in order to describe the bias occurring between the first output word and the second output word of GGHN(8, 32), consideration is given to where conditions of the following Case 1 hold true.

<Case 1>

$$\text{LSB}(S1[i1]+S1[j1])=\text{LSB}(S1[i1]); \text{ however, } \text{LSB}(S1[i1])\neq 1 \qquad 1.$$

$$\text{LSB}(S2[i2]+S2[j2])=i2 \qquad 2.$$

FIG. 5 and FIG. 6 illustrate state transitions of the least significant byte of the array S at t=1 and 2, in Case 1. In FIG. 5, in the array S the value S[1] of the address 1 is A, and the value S[A] of the address A, which should be k0+A, is 0, indicating an inconsistency. In FIG. 6, in the array S, the value S[1] of the address 1 is A, the value S[A] of the address A is k0+A, the value S[A+C] of the address A+C is 2−C, and the value S[2] of the address 2, which should be k0+2, is C, indicating an inconsistency.

From FIG. 2, when t=1, i1=1, and if LSB(S1[i1])=A, j1=A. Here, when condition 1 of Case 1 is satisfied, $$\text{LSB}(S1[1]+S1[A])=\text{LSB}(S1[1])$$

$$\text{LSB}(S1[A])=0 \qquad (1)$$

so that $$\text{LSB}(k1)=\text{LSB}(k0+S1[j1])=\text{LSB}(k0)$$

However, when A=1, $$\text{LSB}(S1[1]+S1[1])=\text{LSB}(S1[1])$$

$$\text{LSB}(S1[1])=0\neq 1$$

and since this is inconsistent with Expression 1, the condition $$\text{LSB}(S1[i1])\neq 1 \text{ is derived.}$$

In the key stream outputted at t=1, the following relationship holds true.

$$\text{LSB}(O1)=\text{LSB}(k0) \qquad (2)$$

In the same way, when t=2, i2=2, and if LSB(S2[i2])=C, j2=A+C.

Here, when condition 2 of Case 1 is satisfied, $$\text{LSB}(S2[2]+S2[A+C])=2$$

$$\text{LSB}(S2[A+C])=2-C$$

In the key stream outputted at t=2, the following relationship holds true.

$$\text{LSB}(O2)=\text{LSB}(k0+2) \qquad (3)$$

Thus, from Expressions (2) and (3), the following relationship must hold concerning the first and second output words O1 and O2.

$$\text{lsb}(O1)=\text{lsb}(O2) \qquad (4)$$

In the same way, consideration is given regarding Case 2.

<Case 2>

$$\text{LSB}(S1[i1]+S1[j1])=\text{LSB}(S1[i1]); \text{ however, } \text{LSB}(S1[i1])\neq 1 \qquad 1.$$

$$\text{LSB}(S2[i2]+S2[j2])=j2 \qquad 2.$$

FIG. 5 and FIG. 7 illustrate state transitions of the least significant byte of the array S at t=1 and 2, in Case 2. In FIG. 7, the value S[1] of the address 1 is A, the value S[2] of the address 2 is C, the value S[A] of the address A is k0+A, the value S[A+C] of the address A+C, which should be k0+A+C, is A, indicating an inconsistency.

Since the internal variable k at t=1 is the same as in Case 1, the relationship Expression (2) with respect to the key stream and the state transition of the array S is also the same.

When condition 2 of Case 2, when t=2, is satisfied, $$\text{LSB}(S2[2]+S2[A+C])=A+C$$

$$\text{LSB}(S2[A+C])=A$$

In the key stream outputted at t=2, the following relationship holds true.

$$\text{LSB}(O2)=\text{LSB}(k0+2\cdot S1[1]) \qquad (5)$$

Therefore, Expressions (2) and (5) must hold true when conditions 1 and 2 of Case 2 are satisfied.

In this way, in both Cases 1 and 2, the same relationship Expression (4) holds true between the first output word O1 and the second output word.

Next, a description is given regarding the fact that this Expression can be used as a distinguisher.

<Probability of Distinguisher Holding True and Necessary Data Amount>

Here, a description is given concerning the probability of Expression (4) used as the distinguisher holding true.

If an output sequence of GGHN(8, 32) is a true random number sequence, the probability that Expression (1), which is a distinguisher, holding true is $2^{\{-1\}}$.

The probability of Expression (4) holding true is dependent on the structure of the PRGA, and is not dependent on the structure of the KSA.

Therefore, in the deliberation below, the array S and the variable k after the KSA is finished each independently follow a uniform distribution.

Firstly, the probabilities p1 and p2 that conditions 1 and 2 of Cases 1 and 2 hold true are as follows. Here, the probability p2 that condition 2 holds true is a probability that gives consideration to Cases 1 and 2.

$$p1=1/256 \cdot 255/256$$

$$p2=1/256 \cdot 1/256+255/256 \cdot 2/256$$

Here, when a condition of neither 1 nor 2 is satisfied, if the probability that Expression (1) holds true is assumed to ideally be ½, the probability pd that Expression (4) holds true for the output sequence of GGHN(8, 32) is given as follows.

$$pd = 1 \cdot p1 \cdot p2 + 1/2 \cdot (1 - p1 \cdot p2) \approx 1/2 \cdot (1 + 2^{\{-15.01\}})$$

Therefore, this is large in comparison to the probability ½ for the true random number sequence.

Next, when Expression (4) is a distinguisher, the data amount necessary for distinguishing between the output sequence of GGHN(8, 32) and a true random number sequence is considered.

According to Non-Patent Document 2, the amount of data necessary for distinguishing between two distributions is shown to be as follows.

For an event distribution X that occurs with a probability of p and an event distribution Y that occurs with a probability of p(q+1), when a certain event e occurs, in order to distinguish between X and Y with a success probability that cannot be ignored, a sample of $O(1/pq^{\{2\}})$ is necessary.

However, the abovementioned proposition holds true when p<<1.

In Non-Patent Document 3, when p=½, the amount of data necessary in order to distinguish between two distributions is shown to be as follows.

For an event distribution X that occurs with a probability of p=½ and an event distribution Y that occurs with a probability of ½(q+1), when a certain event e occurs, in order to distinguish between X and Y with a success probability that cannot be ignored, a sample of $O(1/q^{2})$ is necessary.

An event e in the present attacking is an event for which Expression (4) holds true, and it is possible to consider a distribution of the event e with respect to random numbers as X, and a distribution Y of event e with respect to an output sequence of GGHN(8, 32) as Y.

Therefore, since it is possible to consider $p=2^{-1}$ and $q=2^{-15.01}$, the amount of data necessary for attacking is $O(2^{30.02})$.

Here, the required data amount is a value based on an assumption that the KSA of GGHN(8, 32) is a completely random permutation, and is a theoretical data amount obtained from a structural bias of the PRGA.

Therefore, with respect to GGHN(8, 32), by using the two head words of a key stream for theoretically approximately $2^{30}$ secret keys, it is possible to distinguish a true random number sequence.

In the description of "Bias between a First Output Word and a Second Output Word" (paragraphs 0050 to 0070), a description was given of a structuring method of a distinguisher with respect to the leading two words of the key stream, but a similar relationship holds true for two words of a continuous key stream at an arbitrary time t in Case 1.

Thus, a counter-measure of discarding a few head words of the key stream has no effect.

The "Description of GGHN(n, m) Attack Technique, 'Distinguishing Attack', that is an Object of the Invention" as described above can be summarized in FIG. 5 through FIG. 9.

FIG. 9 represents a data amount (theoretical value) necessary for attacking, and, for cases assuming output equality in which S-box entries are uniformly random by initial processing, describes flow for seeking a theoretical value of the data amount necessary for attacking.

In FIG. 9, output equality is assumed in which the S-box entries are uniformly random by initial processing. This means that at a time of attacking all 256 S values have a possibility of appearing. In FIG. 9, the probability p1 (=1/256) and the probability p2 (=255/256) respectively correspond to the probability of condition 1 occurring, and the probability of condition 2 occurring, with regard to FIG. 5. Furthermore, in FIG. 9, a probability p3 (=(1/256)·(1/256)+(255/256) (2/256)=512/2562) corresponds to a probability that condition 3 will occur with regard to FIG. 7, or that condition 4 will occur with regard to FIG. 6. An amount of data necessary for attacking is $O(q^{-2})=O(2^{30.02})$.

As shown in FIG. 8, it is possible to construct a distinguisher of the improved algorithm proposed by G. Gong et al. FIG. 8 is a figure describing the fact that the Expression $$lsb(O1)=lsb(O2)$$

is taken as the distinguisher.

The lower 8 bits of continuous output are as follows.

$$O1=k0$$

$$O2=k0+2A \quad \text{(condition 3)},$$

$$O2=k0+2 \quad \text{(condition 4)}$$

Therefore, when Expression (4) is the distinguisher, it is possible to distinguish between the output sequence of GGHN(8, 32) and a true random number sequence.

The inventors of the present invention carried out experiments to confirm this, and a description is given below. FIG. 10 and FIG. 11 summarize results of the experiment. FIG. 10 illustrates a probability obtained by a computer experiment and the data amount necessary for attacking. FIG. 11 illustrates a result confirming whether a distinguisher of FIG. 8 is functioning, while making a given data amount N change, in accordance with the computer experiment.

That is, in FIG. 11, the number of times the distinguisher of FIG. 8 holds, while making the given data amount N change, is obtained. An experiment with 100 cases of the secret key is performed, and a rate of rejection is obtained. When $$X-2^{\{N-1\}}>(½)·\sqrt{(2^{\{N-1\}}-2^{\{N-2\}})}$$

is satisfied, if not a random number, it is rejected (if a random number, 30.5% is obtained). Below, the experiment is described.

<Description of Experiment Result>

When Expression (4) is a distinguisher, as shown in FIG. 9, a confirmation is done as to whether or not it is possible to distinguish between the output sequence of GGHN(8, 32) and a true random number sequence. The experiment procedure is as follows.

1. The secret key is randomly changed $2^{w}$ times, and the key streams of GGHN(8, 32) each have 2-word generation.

2. The number of times the Expression (1) holds true with respect to the $2^{w}$ key streams generated in 1. is counted.

3. When the number of times x counted in 2 satisfies the relationship expression below, if the output sequence is not a random number it is rejected. Here, μ represents an average value, and σ represents a standard deviation.

$$μ-x>ρ/2$$

Thus, in the present experiment, when the relationship expression:

$$2^{\{w-1\}}-x>½·(2^{\{w-1\}}-2^{\{w-2\}})^{\{-½\}}$$

is satisfied, if the output sequence is not a random number it is rejected.

4. Given 100 independent cases of the group of $2^{w}$ secret keys given by 1, 1 to 3 are repeated and the rejection rate is obtained.

According to FIG. 11 in which the experiment results are shown in a table, when $2^{28}$ items of data are given, the rejection rate is 85%, and compared to the rejection rate of random numbers, an advantage of 50% or greater was obtained.

Thus, according to the Attack Technique when Expression (4) is the distinguisher, with regard to the output sequence of GGHN(8, 32), by using key streams of approximately $2^{30}$ words, it was experimentally confirmed that it is possible to distinguish a true random number sequence with a very high probability.

In this way, in the output sequences of the conventional GGHN(8, 32), by the Attack Technique when Expression (4)

$$\{lsb(O1)=lsb(O2)\}$$

is the distinguisher, the key stream can be distinguished with respect to true random number sequence with a high probability, and there is a problem in that security is low.

The present invention has been made by the inventors based on a recognition of the abovementioned problems, and an object thereof is the provision of an encryption device, a program, and a method with high security for keeping data confidential.

In order to solve one or more of the abovementioned problems the invention disclosed in the present application is composed as in the following outline.

The present invention proposes measures having resistance to analysis methods as in the abovementioned problems. Furthermore, in implementations of the measures, consideration has been given so as not to damage ability to make implementations nor security as asserted by encryption designers.

According to one aspect of the present invention, there is provided an encryption device which generates a pseudo-random number sequence based on a secret key and applies the pseudo-random number sequence to a plain text so as to generate an encrypted text, wherein, using an internal state in accordance with a state based on a permutation of a sequence of a finite number of numeric values, as an internal state used for generation of the pseudo-random number sequence, a predetermined leftward or rightward rotate shift, depending on a number smaller than an internal state number, based on the result of linear or non-linear, or combination of linear and non-linear using one or more numeric values of the internal state is executed and at least one temporary variable used for generation of the pseudo-random number sequence is set to be a temporary variable having as a value a result of the execution of the predetermined leftward or rightward rotate shift, and the pseudo-random number is generated by a predetermined prescribed operation on one or a plurality of numeric values of the internal state and the temporary variable.

In the present invention, for an internal state in accordance with a state based on a permutation of the sequence of the finite number of numeric values, updating of the internal state may be performed using a linear operation and a non-linear operation outside of permutation.

The present invention may be configured such that, for an internal state in accordance with a state based on a permutation of the sequence of the finite number of numeric values, in updating of the internal state, the number of states with respect to the internal state increases monotonically, by using a linear operation and a non-linear operation outside of permutation. Or, the invention may be such that the number of states with respect to the internal state decreases monotonically.

The present invention may be configured such that, for an internal state in accordance with a state based on a permutation of the sequence of the finite number of numeric values, in updating of the internal state, by using a linear operation and a non-linear operation outside of permutation, the number of states with respect to the internal state is oscillated.

The present invention may be configured such that updating of the internal state is performed for each output of the pseudo-random number sequence. Or, the invention may be such that this is performed more times than the outputs of the pseudo-random number sequence. Or, the invention may be such that this is performed fewer times than the outputs of the pseudo-random number sequence.

The present invention may be configured such that the direction and/or numerical value (shift number) of the rotate shift may be dynamically changed depending on a numerical value of the internal state.

The present invention may be configured such that the direction and numerical value (shift number) of the rotate shift may be changed according to a value of a pre-determined table.

A device according to another aspect of the present invention is provided with a first processing unit (KSA) that, as an internal state used for generation of the pseudo-random number sequence, creates an initial state of the array S, by mixing elements of an array S by repeating permutation of and arithmetic addition of the elements of the array S and, at this time, obtains an initial value of an internal variable k that is the temporary variable, from the elements of the array S; and a second processing unit (PRGA) that, when generating the pseudo-random number (referred below to as "key stream"), updates the value of the internal variable k with a value obtained by performing a rotate shift operation on a result of addition of the internal variable k and an element $S[j]$ of the array S related to first and second index variables i and j, outputs a key stream, based on a result of addition of the internal variable k and a reference result $S[(S[i]+S[j])]$ of the array S according to $S[i]+S[j]$, and updates the element $S[(S[i]+S[j])]$ of the array S referred to in order to generate the key stream, using the array element $S[i]$ and the internal variable k immediately, after output of the key stream.

A device according to another aspect of the present invention is provided with a first processing unit (KSA) that, as an internal state used for generation of the pseudo-random number sequence, creates an initial state of the array S, by mixing elements of an array S by repeating permutation of and arithmetic addition of the elements of the array S, and, at this time, obtains an initial value of an internal variable k that is the temporary variable, from the elements of the array S; and a second processing unit (PRGA) that updates a value of the second index variable j, based on a result of an arithmetic addition of a value obtained by performing a first shift number of rotate shift operations on an array element $S[i]$ of a first index variable i, and a second index variable j, updates a value of the internal variable k, based on a result of an arithmetic addition of a value obtained by performing a second shift number of rotate shift operations on an array element $S[j]$ of a second index variable j, and an internal variable k, outputs a key stream, based on a result of an arithmetic addition of a value obtained by performing a third shift number of rotate shift operations on the array element $S[(S[i]+S[j])]$ according to $S[i]+S[j]$, and updates the array element $S[(S[i]+S[j])]$ referred to in order to generate the key stream, using the array element $S[i]$ and the internal variable k immediately after output of the key stream.

The present invention may be configured to be provided with a first processing unit (KSA) that, using an initially set array a, performs permutation and mixing of the array a, obtains an internal variable k that is the temporary variable, by performing arithmetic addition of a corresponding array element a that has undergone a rotate shift operation, and obtains an array S as an internal state used for generation of the pseudo-random number sequence, by a prescribed operation on elements of the array a that have undergone a rotate shift operation and elements of the array S; and a second processing unit (PRGA) that performs an arithmetic addition of an internal variable k and a reference result $S[j]$ of the array S related to first and second index variables i and j, outputs a key stream, based on the internal variable k and a reference result of the array S according to $S[i]+S[j]$, and updates entries of S referred to in order to generate the key stream, using the internal variable k, immediately after output of the key stream. The abovementioned first processing unit (KSA) and the second processing unit (PRGA) may be implemented as a computer program (software).

Furthermore, in the present invention, there is provided a method of generating a pseudo-random number sequence using a computer, the method comprising:

using an internal state in accordance with a state based on a permutation of a sequence of a finite number of numeric values, as an internal state used for generation of the pseudo-random number sequence;

executing a predetermined leftward or rightward rotate shift, depending on a number smaller than an internal state number, based on the result of linear or non-linear, or combination of linear and non-linear using one or more numeric values of the internal state and setting at least one temporary variable used for generation of the pseudo-random number sequence to be a temporary variable having as a value a result of the execution of the predetermined leftward or rightward rotate shift; and generating the pseudo-random number by a predetermined prescribed operation on one or a plurality of numeric values of the internal state and the temporary variable. According to the present invention, a method including each process of the abovementioned first processor (KSA) and the second processor (PRGA) is provided.

According to the present invention, it is possible to make construction of a distinguisher for GGHN(n, m) difficult, and to avoid deterioration of speed capability possessed by the GGHN(n, m). As a result, the present invention can provide an encryption device with high security for keeping data confidential when communicating or storing the data.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

FIG. 2 illustrates an improved algorithm of RC4 as proposed in 32-bit RC4 (CISC 2005).

FIG. 4 is a diagram showing a state transition (2) of the PRGA.

FIG. 8 illustrates an analysis (4) of the PRGA.

FIG. 9 illustrates data amount (theoretical value) necessary for attacking.

FIG. 10 illustrates data amount (experimental value) necessary for attacking.

FIG. 11 illustrates an experiment result (distinguisher).

FIG. 12 illustrates a stream cipher algorithm presented by G. Gong et al.

FIG. 13 illustrates a modified algorithm of the present invention.

FIG. 16 illustrates a solution proposal (1).

FIG. 17 illustrates a solution proposal (2).

PREFERRED MODES FOR CARRYING OUT THE INVENTION

Figure 1:
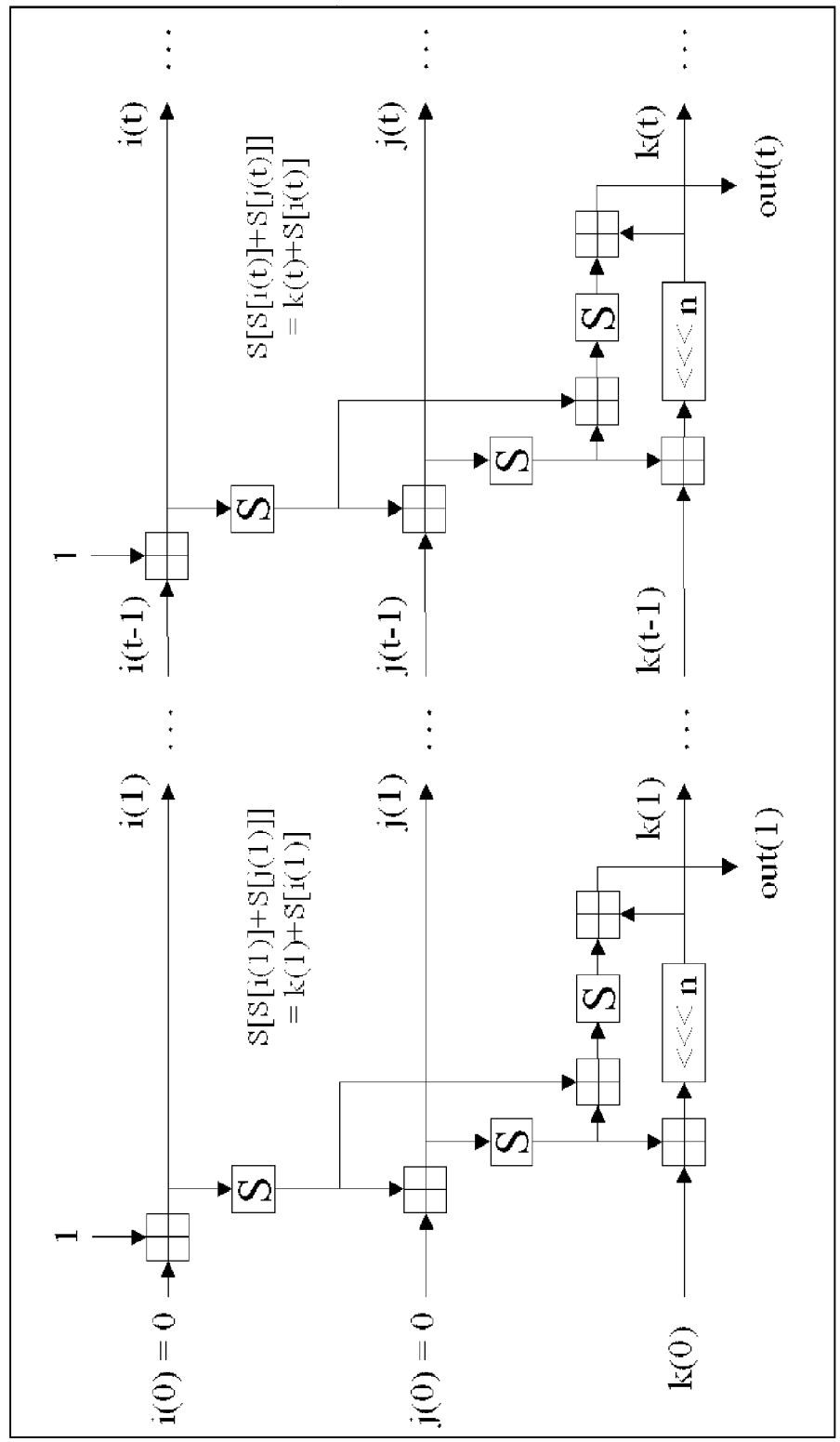
FIG. 1 is a block diagram illustrating a first exemplary embodiment of the present invention.
Figure 3:
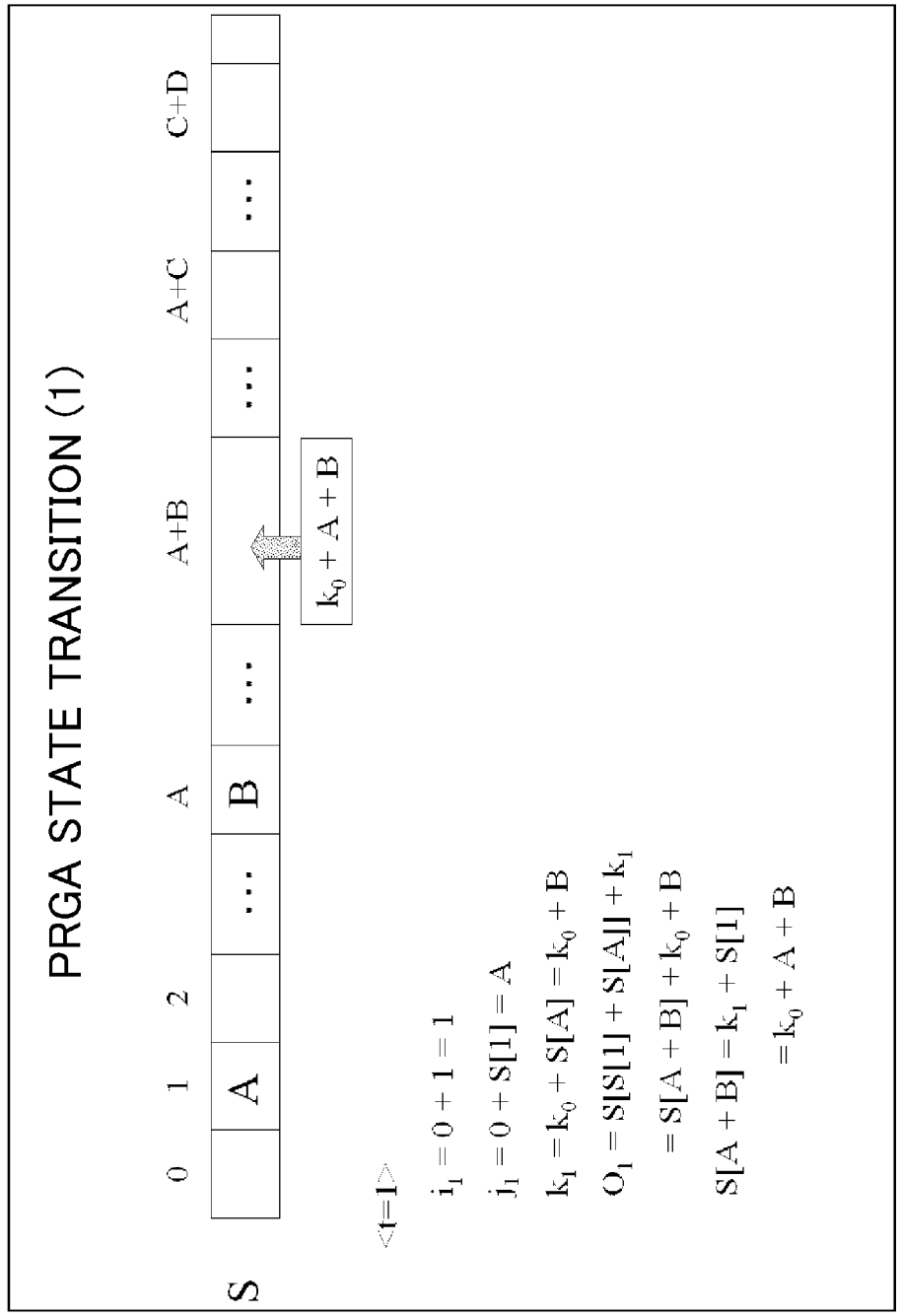
FIG. 3 is a diagram showing a state transition (1) of a PRGA.

The abovementioned present invention will be further described in detail. FIG. 13 is a diagram for describing a modified algorithm of the present invention. FIG. 13 illustrates locations to be modified in the original algorithm, with respect to the present invention.

An analysis technique that is the abovementioned issue is one which utilizes a structural vulnerability of a PRGA.

Moreover, in the analysis technique, all internal storage is regarded as being uniformly distributed, according to a KSA.

Therefore, in a first aspect of the present invention, a modification was not implemented in the KSA, and an improvement was carried out only for the PRGA.

A modification of an algorithm in a solution means shown in FIG. 13 (a modification from the PRGA algorithm of FIG. 2) includes performing leftward rotate processing $k=((k+S[j])<<<n) \bmod M$, when a variable k is updated (in this regard, $N=2^{\{n\}}$, and $M=2^{\{m\}}$).

The number of rotates is of n bits, for cases of GGHN(n, m).

According to the present invention, with an internal variable k that is at least one temporary variable used for generation of a pseudo-random number sequence, as a result of executing an n bit rotate shift $((k+S[j])<<<n)$, based on a linear or non-linear, or a linear and non-linear combination result using one or more numeric values of the internal state, the pseudo-random number to be generated is generated by an operation on one or a plurality of numeric values of the internal state and the temporary variable.

Here, in order to describe an effect of the solution means according to the present invention, in Case 1 an internal variable k0, and S1[A] and S2[A+C] are represented as below, using a byte unit variable.

Here, a lower bit is on the right side, and LSB(k0)=k00.

In this regard, according to Expression (1), LSB(S1[A])=B0=0.

$$k0 = k03\|k02\|k01\|k00$$

$$S1[A] = B3\|B2\|B1\|B0$$

$$S2[A+C] = A3\|A2\|A1\|A0$$

At this time, ignoring an effect of a carry stepping over bytes occurring in arithmetic addition, with respect to the least significant byte in the PRGA shown in FIG. 13, since at least 2 independent variables following a uniform distribution must be inserted, a bias no longer occurs in Expression (1).

In the same way, in a comparison between any bytes, since at least 2 independent variables following a uniform distribution must be inserted, a bias can be considered to no longer occur.

In actuality, there is an effect of a carry exceeding a byte, but there is no effect to the fundamental way of thinking.

Furthermore, considering implementation with respect to the solution means of FIG. 13, a process increase is one rotate process.

As a comparative example of FIG. 13, the original algorithm is shown in FIG. 12. Updating of the variable k is performed as in $$k = (k+S[j]) \bmod M$$

Furthermore, in the present invention, in cases assuming implementation of software in a 32-bit/64-bit processor, as an implementation target, in n-bit leftward rotate processing, deterioration of speed is considered to be small.

Furthermore, according to the present invention, since improvement is possible without using new internal memory, there is no increase in memory.

Therefore, according to the present invention, the solution means of FIG. 13 promises to enable an encryption model in which:
  design principles of the designers are not undermined, and
  advantages of implementation are not damaged.

Next, FIG. 16 illustrates an example of a solution means by a modification of KSA(K, S), according to the present invention. The variable k is updated by a value obtained by an arithmetic addition of the variable k and a value obtained by performing a leftward 8×r bit rotate on a[i]. S[i] is updated by an operation result (exclusive-OR operation) on a value obtained by performing a leftward 8×(3−r) bit rotate on a[i], and S[i].

In the solution means according to the modification of KSA(K, S) in FIG. 16, it was confirmed by experiment that the S-box is random to a certain extent, and has equal output when viewed from each byte.

The speed of the KSA is approximately 2.5 times faster (approximately 8 times slower in comparison to the KSA of the RC4), and since an initial value table is not used, it is possible to reduce, for example, 1 Kbyte of memory.

In the solution means of FIG. 16, the direction and/or the shift number of the rotate shift, being dependent on a numerical value of the internal state, can be dynamically modified. The arrangement may be such that the direction and/or the shift number of the rotate shift change according to a table value determined in advance.

FIG. 17 illustrates another example of a solution means according to a modification of the PRGA(S). The value of j is updated by a result of arithmetic addition of j and (S[i]>>>24) that is obtained by performing a rightward 24-bit rotate shift of S[i]; the value of k is updated by a result of arithmetic addition of k and (S[j]>>>24) that is obtained by performing a rightward 16-bit rotate shift of S[j]; and a result of arithmetic addition of k and S[(S[i]+S[j]) mod N] that is obtained by performing a rightward 8-bit rotate is "out".

In cases of this solution means, a relationship between key streams (first and second output bytes O1 and O2) is $$O1=k0+X O2=k0+Y$$

and is a relationship in which the value of Y is determined according to the value of X.

Therefore, it is also possible to select S-box entries referred to with an assumed index. Since index information used in the assumption is not brought into the above relationship expression (not brought into an identity that does not depend on information of X and Y), it is difficult to apply a Distinguishing Attack.

The present invention may be such that, with the internal state being in accordance with a state based on a permutation of the sequence of the finite number of numeric values, updating of the internal state may be performed by using a linear operation and a non-linear operation, outside of permutation.

The present invention may be such that, with the internal state being in accordance with a state based on a permutation of the sequence of the finite number of numeric values, for updating of the internal state, by using a linear operation and a non-linear operation outside of permutation the sequence, the number of states with respect to the internal state may be increased monotonically. Or, the array may be such that, for updating of the internal state, by using a linear operation and a non-linear operation outside of permutation the sequence, the number of states with respect to the internal state may be decreased monotonically.

The present invention may be such that, with the internal state being in accordance with a state based on a permutation of the sequence of the finite number of numeric values, for updating of the internal state, by using a linear operation and a non-linear operation outside of permutation, the number of states with respect to the internal state is oscillated.

The present invention may be such that updating of the internal state is performed for each output of the pseudo-random number sequence. Or, the invention may be such that this is performed for more times than the outputs of the pseudo-random number sequence. Or, the invention may be such that this is performed fewer times than the outputs of the pseudo-random number sequence. A description will be given according to the following exemplary embodiment.

Exemplary Embodiment

Figure 14:
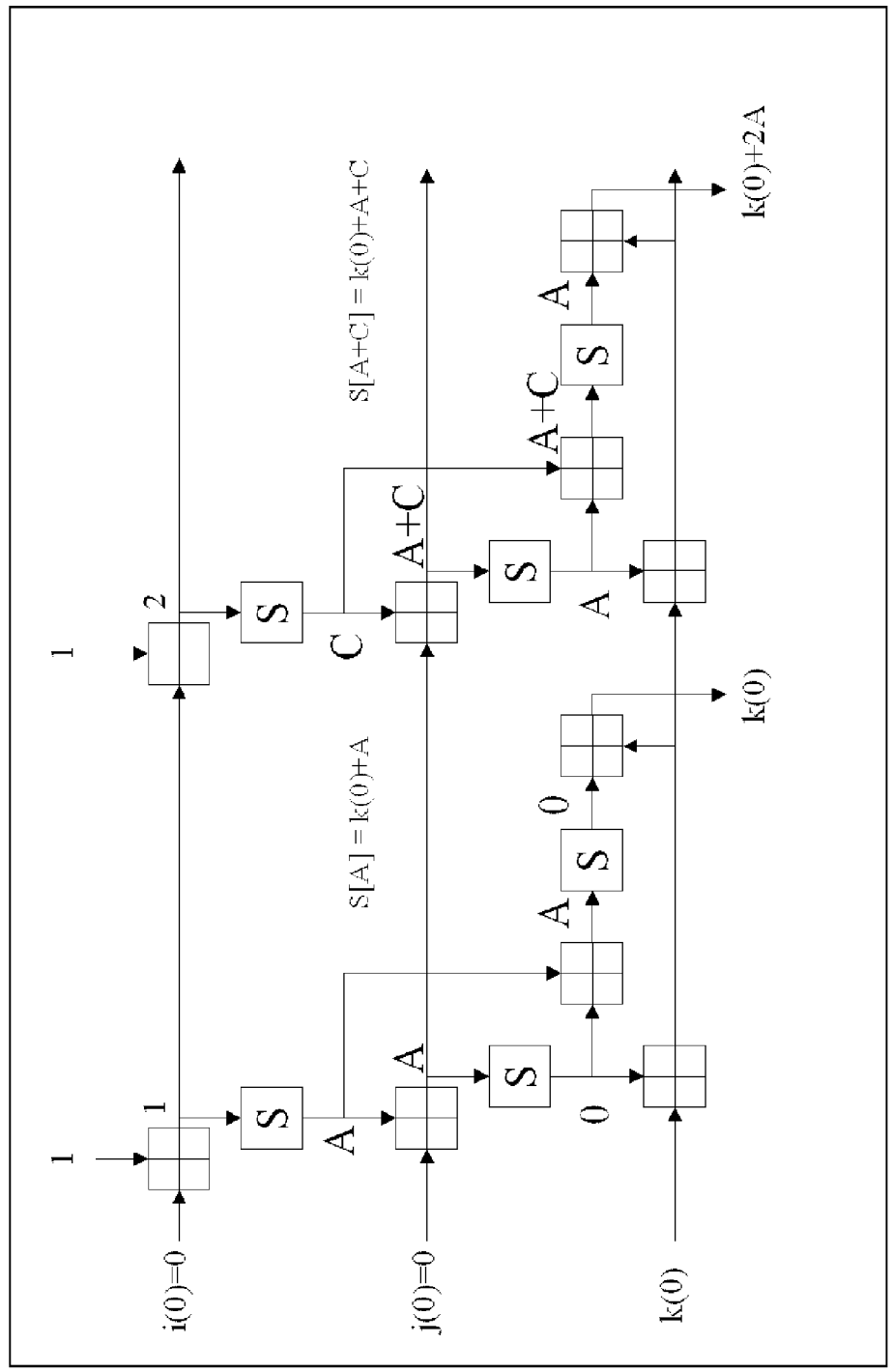
FIG. 14 illustrates a specific example 1 of a problem to be solved.
Figure 15:
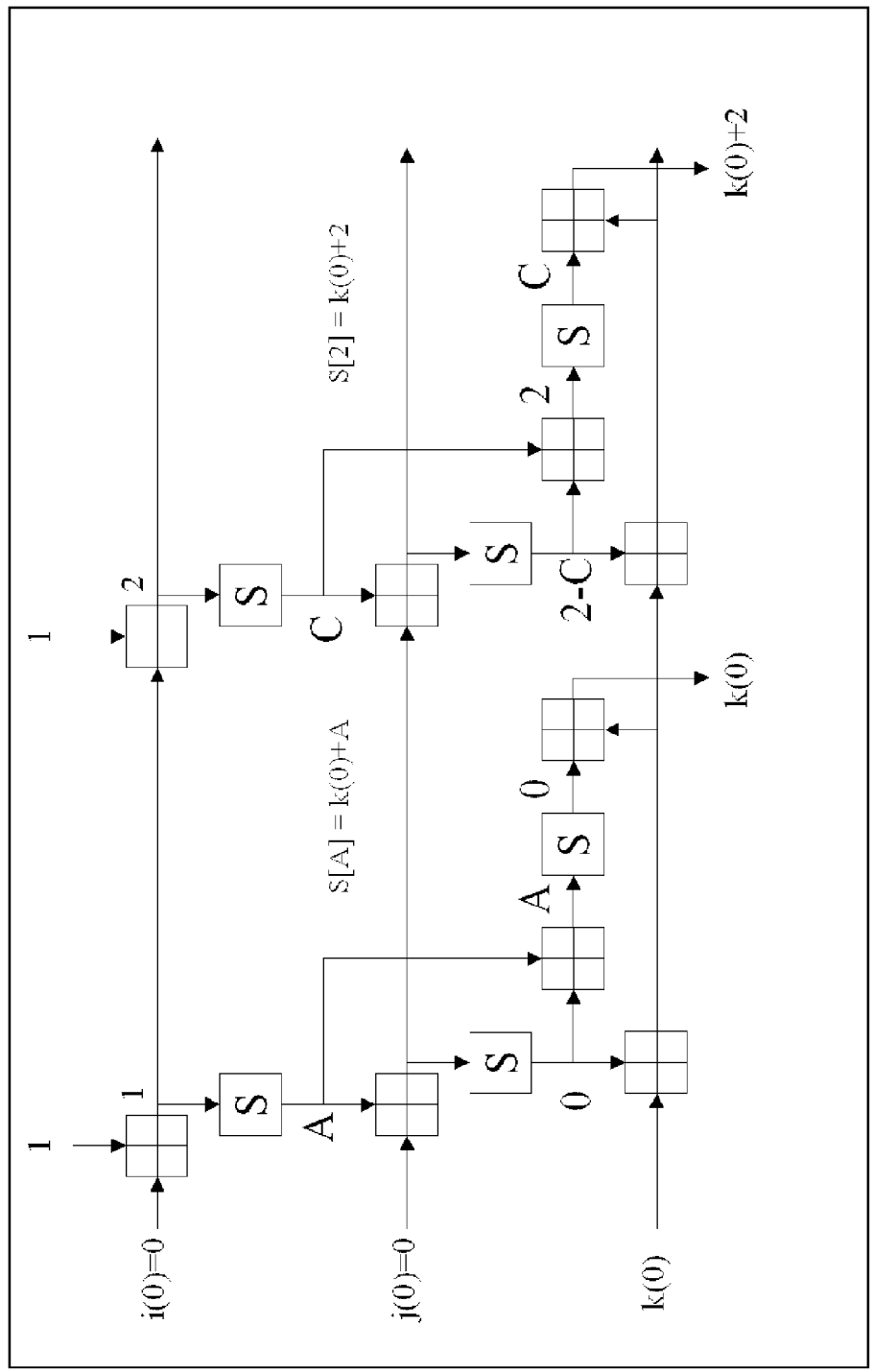
FIG. 15 illustrates a specific example 2 of a problem to be solved.

FIG. 1 is a diagram for describing a first exemplary embodiment of the present invention. FIG. 14 and FIG. 15 are block diagrams showing specific examples 1 and 2 of a problem which the present invention intends to solve, as comparative examples. Below, one exemplary embodiment of the present invention is described. As shown in FIG. 1, in the process <<<n, for k(0), a leftward rotate process (k+S[j]) <<<n is performed to give k(1). (S[(S[i]+S[j])mod N]+k(1)) mod M gives out(1).

Figure 5:
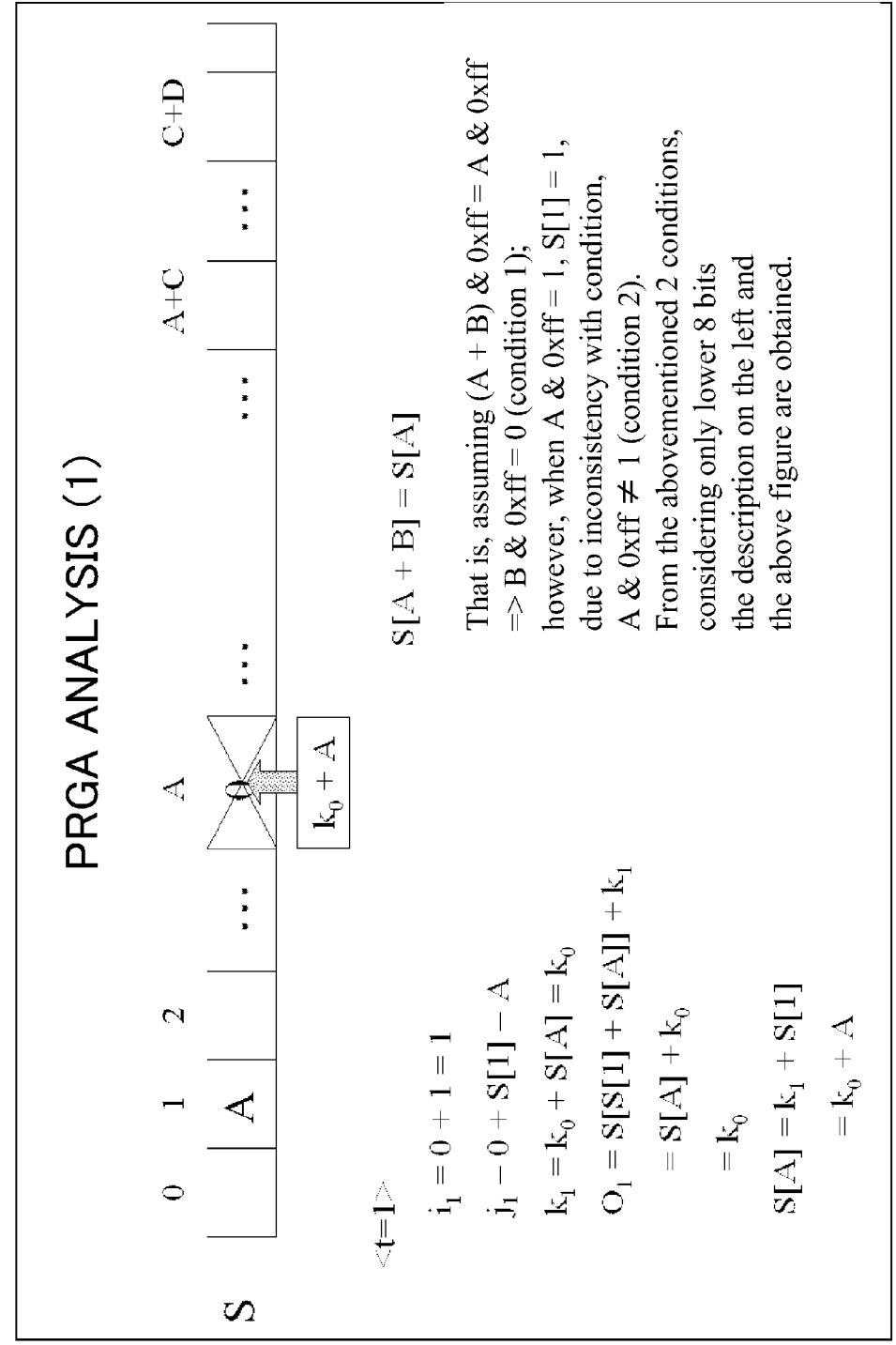
FIG. 5 illustrates an analysis (1) of the PRGA.
Figure 6:
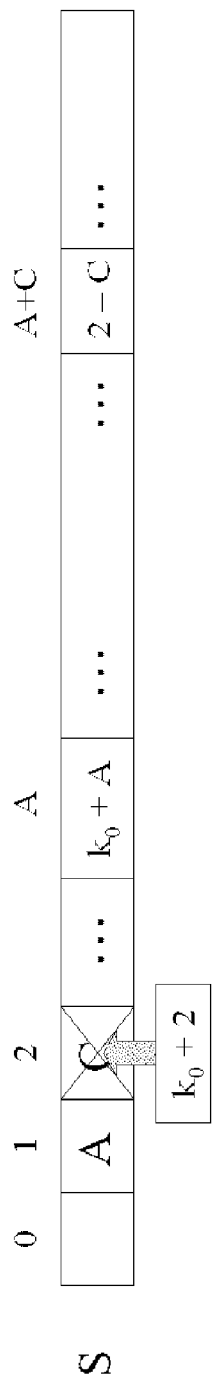
FIG. 6 illustrates an analysis (3) of the PRGA.
Figure 7:
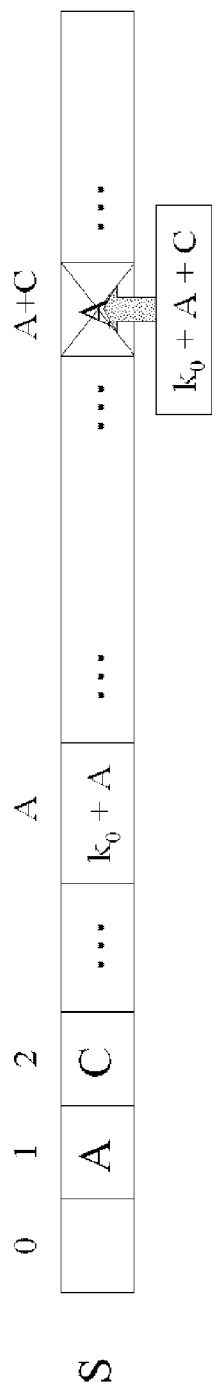
FIG. 7 illustrates an analysis (2) of the PRGA.

As the specific example 1 of a problem which the present invention intends to solve, FIG. 14 illustrates a process from FIG. 5 to FIG. 7 (a state transition of a least significant byte of the array S for t=1, 2, under conditions of Case 2). A state change is shown by an S box, and is not represented in the figure. First, a description is given making reference to the comparative example of FIG. 14 (an algorithm is shown in FIG. 12).

At time 1, index i is 1 (refer to 1 outputted from a box pointed to by an arrow of j(0)). A cross box with inputs index i(0) and 1, represents arithmetic addition, and i=(i+1) mod N=1 is outputted.

A value S[1] (lower 8 bits) of an address i is A, and index j is A. In FIG. 1, FIG. 14, and FIG. 15, a box in which S is enclosed in a square is an S-box, and in cases, for example, in which an index (for example 1) is inputted and S[1] is A, in the figures A is outputted from a box. A box (arithmetic adder) with j(0) and A as input, outputs j(0)=(j(0)+A) mod N=A.

A value S[j] (lower 8 bits) of the address j is 0, and a value (lower 8 bits) of the variable k is $$0+k0=k0$$

Since a value S[i] (lower 8 bits) of the address i is A, and a value S[j] (lower 8 bits) of the address j is 0, an address necessary for generating output O1 is $$S[i]+S[j]=A+0=A$$

Since a value S[A] (lower 8 bits) of the address A is 0, and a value (lower 8 bits) of the variable k is k0, a value (lower 8 bits) of output O1 is $$0+k0=k0$$

After generating the output O1, a value S[A] (lower 8 bits) of the address A is updated to $$k0+A$$

At time 2, the index i is 2.

The value S[i] (lower 8 bits) of the address i is C, and the index j is A+C.

The value S[j] (lower 8 bits) of the address j is A, and a value (lower 8 bits) of the variable k is $$k0+A$$

Since the value S[i] (lower 8 bits) of the address i is C, and a value S[j] (lower 8 bits) of the address j is A, an address necessary for generating output O2 is $$S[i]+S[j]=A+C$$

Since a value S[A+C] (lower 8 bits) of the address A+C is A, and a value (lower 8 bits) of the variable k is k0+A, a value (lower 8 bits) of output O2 is $$A+k0+A=k0+2A$$

After generating the output O2, the value S[A+C] (lower 8 bits) of the address A+C is updated to $$k0+A+C$$

FIG. 15, as a comparative example of FIG. 1, illustrates a specific example 2 of a problem the present invention intends to solve, and is a drawing showing a process from FIG. 5 to FIG. 6 (a state transition of a least significant byte of the array S when t=1, 2 under a condition of Case 1). A state change is shown by an S box, and is not represented in the drawing.

Referring to FIG. 15 the index i is 1 at time 1.

The value S[i] (lower 8 bits) of the address i is A, and the index j is A.

A value S[j] (lower 8 bits) of the address j is 0, and a value (lower 8 bits) of the variable k is $$0+k0=k0$$

Since a value S[i] (lower 8 bits) of the address i is A, and the value S[j] (lower 8 bits) of the address j is 0, an address necessary for generating output O1 is $$S[i]+S[j]=A+0=A$$

Since the value S[A] (lower 8 bits) of the address A is 0, and the value (lower 8 bits) of the variable k is k0, the value (lower 8 bits) of output O1 is $$0+k0=k0$$

After generating the output O1, the value S[A] (lower 8 bits) of the address A is updated to $$k0+A$$

At time 2, the index i is 2.

The value S[i] (lower 8 bits) of the address i is C, and the index j is A+C.

The value S[j] (lower 8 bits) of the address j is 2−C, and the value (lower 8 bits) of the variable k is $$k0+2-C$$

Since the value S[i] (lower 8 bits) of the address i is C, and the value S[j] (lower 8 bits) of the address j is 2−C, an address necessary for generating output O2 is $$S[i]+S[j]=C+2-C=2$$

Since the value S[2] (lower 8 bits) of the address 2 is C, and the value (lower 8 bits) of the variable k is k0+2−C, the value (lower 8 bits) of the output O2 is $$C+k0+2-C=k0+2$$

After generating the output O2, the value S[2] (lower 8 bits) of the address 2 is updated to $$k0+2-C+C=k0+2$$

In one exemplary embodiment of the present invention, different to the comparative example of FIG. 14 and FIG. 15, as shown in FIG. 1, a rotate shift (<<<n) is added to the process. k(O)=rotate shift (<<<n) is ((k+S[j])<<<n) mod M In the present exemplary embodiment, similar to FIG. 14, at time 1 the index i is 1. The value S[i] (lower 8 bits) of the address i is A, and the index j is the lower 8 bits of A.

The value S[j] (lower 8 bits) of the address j is B (lower 8 bits are 0), and the value of the variable k is Roln(k0+B). Roln represents Rotate-Left-Shift by n-bits. That is, Roln(k0+B) corresponds to k=((k+S[j]<<<n) mod M of FIG. 13, and k0=((k0+B)<<<n) mod M is executed.

Since the value S[i] (lower 8 bits) of the address i is A, and the value S[j] (lower 8 bits) of the address j is B, an address necessary for generating output O1 is $$S[i]+S[j]=A+0=A$$

Since the value S[A] of the address A is B (lower 8 bits are 0), and the value of the variable k is Roln(k0+B), the value (lower 8 bits) of the output O1 is $$0+\text{Roln}(k0+B)=\text{Roln}(k0+B)$$

After generating the output O1, a value S[A] (lower 8 bits) of the address A is updated to $$\text{Roln}(k0+B)+A$$

At time 2, the index i is 2.

The value S[i] (lower 8 bits) of the address i is C, and the index j is the lower 8 bits of A+C.

The value S[j] (lower 8 bits) of the address j is A, and the value of the variable k is $$\text{Roln}(\text{Roln}(k0+B)+A)$$

Since the value S[i] (lower 8 bits) of the address i is C, and the value S[j] (lower 8 bits) of the address j is A, the address necessary for generating the output O2 is $$S[i]+S[j]=A+C$$

Since the value S[A+C] (lower 8 bits) of the address A+C is A, and the value of the variable k is Roln(Roln(k0+B)+A), the value (lower 8 bits) of the output O2 is $$A+\text{Roln}(\text{Roln}(k0+B)+A)$$

After generating the output O2, the value S[A+C] (lower 8 bits) of the address A+C is updated to $$\text{Roln}(\text{Roln}(k0+B)+A)+C$$

Next, in the present exemplary embodiment of FIG. 1, based on FIG. 15, the index i is 1 at time 1.

The value S[i] (lower 8 bits) of the address i is A, and the index j is the lower 8 bits of A+C.

The value S[j] (lower 8 bits) of the address j is B (the lower 8 bits are 0), and the value of the variable k is $$\text{Roln}(k0+B)$$

Since the value S[i] of the address i is A, and the value S[j] of the address j is B (the lower 8 bits are 0), the address necessary for generating the output O1 is $$S[i]+S[j]=A+0=A$$

Since the value S[A] (lower 8 bits) of the address A is B (the lower 8 bits are 0), and the value of the variable k is Roln(k0+B), the value (lower 8 bits) of the output O1 is $$0+\text{Roln}(k0+B)=\text{Roln}(k0+B)$$

After generating the output O1, the value S[A] (lower 8 bits) of address A is updated to $$\text{Roln}(k0+B)+A$$

At time 2, the index i is 2.

The value S[i] (lower 8 bits) of the address i is C, and the index j is the lower 8 bits of A+C.

The value S[j] (lower 8 bits) of the address j is 2−C, and the value of the variable k is $Roln(Roln(k0+B)+2−C)$ Since the value S[i] of the address i is C, and the value S[j] of the address j is 2−C, the address necessary to generate the output O2 is $S[i]+S[j]=C+2−C=2$ Since the value S[2] (lower 8 bits) of the address 2 is C, and the value of the variable k is $Roln(Roln(k0+B)+2−C)$, the value (lower 8 bits) of the output O2 is $C+Roln(Roln(k0+B)+2−C)$ After generating the output O2, the value S[2] (lower 8 bits) of the address 2 is updated to $Roln(Roln(k0+B)+2−C)+C$ According to the present invention, it is possible to obtain an encryption device with high security for keeping data confidential when communicating or storing the data.

A program according to the present invention described by referring to FIG. 13, FIG. 16, and FIG. 17 can be applied to an arbitrary application which generates the key stream. The encryption device according to the present invention has a configuration that includes, for example, a CPU of a server device, a storage device, a network, and the like. Secret key information is stored in the storage device of the server device. In the configuration illustrated in FIG. 1, a rotate shift operation is performed by an ALU (arithmetic logic unit) of a CPU.

A description has been given above according to the abovementioned exemplary embodiment of the present invention, but the present invention is not limited to only configurations of the abovementioned exemplary embodiment, and clearly includes every type of transformation and modification that a person skilled in the art can realize within the scope of the present invention.

What is claimed is:

1. An encryption device including
    a generator which generates a pseudo-random number sequence based on a secret key and applies the pseudo-random number sequence to a plain text so as to generate an encrypted text,
    the generator comprising:
    a section that uses an internal state in accordance with a state based on a permutation of a sequence of a finite number of numeric values, as an internal state used for generation of the pseudo-random number sequence, and executes a predetermined leftward or rightward rotate shift, depending on a number smaller than an internal state number, based on the result of a linear operation or a non-linear operation, or a combination of a linear operation and a non-linear operation using one or more numeric values of the internal state, and sets at least one temporary variable used for generation of the pseudo-random number sequence to be a temporary variable having as a value a result of the execution of the predetermined leftward or rightward rotate shift, and
    a section that generates the pseudo-random number by a predetermined prescribed operation on one or a plurality of numeric values of the internal state and the temporary variable.

2. The encryption device according to claim 1, wherein, with respect to an internal state in accordance with a state based on a permutation of the sequence of the finite number of numeric values, updating the internal state is performed using a linear operation and a non-linear operation, outside of permutation.

3. The encryption device according to claim 1, wherein, with respect to an internal state in accordance with a state based on a permutation of the sequence of the finite number of numeric values, updating of the internal state is performed using a linear operation and a non-linear operation, outside of permutation, and number of states with respect to the internal state is changed according to one of a monotonic increase and a monotonic decrease.

4. The encryption device according to claim 1, wherein, with respect to an internal state in accordance with a state based on a permutation of the sequence of the finite number of numeric values, updating of the internal state is performed using a linear operation and a non-linear operation, outside of permutation, and number of states with respect to the internal state is oscillated.

5. The encryption device according to claim 1, wherein updating of the internal state is performed by any one selected from
    performing updating for each output of the pseudo-random number sequence,
    performing updating more times than outputs of the pseudo-random number sequence, and
    performing updating fewer times than the outputs of the pseudo-random number sequence.

6. The encryption device according to claim 1, wherein direction and/or shift number of the rotate shift is dynamically changed depending on a numerical value of the internal state.

7. The encryption device according to claim 1, wherein direction and shift number of the rotate shift are changed according to a value of a pre-determined table.

8. The encryption device according to claim 1, comprising:
    a first processing unit that, as an internal state used for generation of the pseudo-random number sequence, creates an initial state of the array S, by mixing elements of an array S by repeating permutation of and arithmetic addition of the elements of the array S and, at this time, obtains an initial value of an internal variable k that is the temporary variable, from the elements of the array S; and
    a second processing unit that, when generating the pseudo-random number (referred below to as "key stream"),
    updates the value of the internal variable k with a value obtained by performing a rotate shift operation on a result of addition of the internal variable k and an element S[j] of the array S related to first and second index variables i and j,
    outputs a key stream, based on a result of addition of the internal variable k and a reference result S[(S[i]+S[j])] of the array S according to S[i]+S[j], and
    updates the element S[(S[i]+S[j])] of the array S referred to in order to generate the key stream, using the array element S[i] and the internal variable k immediately, after output of the key stream.

9. The encryption device according to claim 8, wherein number N of elements of the array S and shift number n of a rotate shift have a relationship $N=2^n$.

10. The encryption device according to claim 1, comprising:
    a first processing unit that, as an internal state used for generation of the pseudo-random number sequence, creates an initial state of the array S, by mixing elements of an array S by repeating permutation of and arithmetic addition of the elements of the array S, and, at this time, obtains an initial value of an internal variable k that is the temporary variable, from the elements of the array S; and a second processing unit that, when generating the pseudo-random number (referred below to as "key stream"), updates a value of the second index variable j, based on a result of an arithmetic addition of a value obtained by performing a first shift number of rotate shift operations on an array element S[i] of a first index variable i, and a second index variable j, updates a value of the internal variable k, based on a result of an arithmetic addition of a value obtained by performing a second shift number of rotate shift operations on an array element S[j] of a second index variable j, and an internal variable k, outputs a key stream, based on a result of an arithmetic addition of a value obtained by performing a third shift number of rotate shift operations on the array element S[(S[i]+S[j])] according to S[i]+S[j], and updates the array element S[(S[i]+S[j])] referred to in order to generate the key stream, using the array element S[i] and the internal variable k immediately after output of the key stream.

11. The encryption device according to claim 1, comprising:

a first processing unit that, using an initially set array a, performs permutation and mixing of the array a, obtains an internal variable k that is the temporary variable, by performing arithmetic addition of a corresponding array element a that has undergone a rotate shift operation, and obtains an array S as an internal state used for generation of the pseudo-random number sequence, by a prescribed operation on elements of the array a that have undergone a rotate shift operation and elements of the array S; and a second processing unit that, when generating the pseudo-random number (referred below to as "key stream"), performs an arithmetic addition of an internal variable k and a reference result S[j] of the array S related to first and second index variables i and j, outputs a key stream, based on the internal variable k and a reference result of the array S according to S[i]+S[j], and updates entries of S referred to in order to generate the key stream, using the internal variable k, immediately after output of the key stream.

12. A non-transitory computer readable medium containing a program for causing a computer constituting an encryption device which generates a pseudo-random number sequence based on a secret key, and generates an encrypted text by applying the pseudo-random number sequence to a plain text, to execute the processing of:

using, as an internal state used for generation of the pseudo-random number sequence, an internal state in accordance with a state based on a permutation of a sequence of a finite number of numeric values;

executing a predetermined leftward or rightward rotate shift, depending on a number smaller than an internal state number, based on the result of a linear operation or a non-linear operation, or a combination of a linear operation and a non-linear operation using one or more numeric values of the internal state;

setting at least one temporary variable used for generation of the pseudo-random number sequence to be a temporary variable having as a value a result of the execution of the predetermined leftward or rightward rotate shift; and generating the pseudo-random number by a predetermined prescribed operation on one or a plurality of numeric values of the internal state and the temporary variable.

13. The medium according to claim 12, which, with respect to an internal state in accordance with a state based on a permutation of the sequence of the finite number of numeric values, performs updating of the internal state using a linear operation and a non-linear operation, outside of permutation.

14. The medium according to claim 12, which, with respect to an internal state in accordance with a state based on a permutation of the sequence of the finite number of numeric values, performs updating of the internal state using a linear operation and a non-linear operation, outside of permutation, and changes number of states with respect to the internal state according to one of a monotonic increase and a monotonic decrease.

15. The medium according to claim 12, which, with respect to an internal state in accordance with a state based on a permutation of the sequence of the finite number of numeric values, performs updating of the internal state using a linear operation and a non-linear operation, outside of permutation, and oscillates number of states with respect to the internal state.

16. The medium according to claim 12, in which updating of the internal state is performed by any one selected from performing updating for each output of the pseudo-random number sequence, performing updating more times than outputs of the pseudo-random number sequence, and performing updating fewer times than the outputs of the pseudo-random number sequence.

17. The medium according to claim 12, wherein direction and/or shift number of the rotate shift is dynamically changed depending on a numerical value of the internal state.

18. The medium according to claim 12, wherein direction and shift number of the rotate shift are changed according to a value of a pre-determined table.

19. The medium according to claim 12 which causes the computer to execute:

a first processing that, as an internal state used for generation of the pseudo-random number sequence, creates an initial state of the array S, by mixing elements of an array S by repeating permutation of and arithmetic addition of the elements of the array S and, at this time, obtains an initial value of an internal variable k that is the temporary variable, from the elements of the array S; and a second processing that, when generating the pseudo-random number (referred below to as "key stream"), updates the value of the internal variable k with a value obtained by performing a rotate shift operation on a result of addition of the internal variable k and an element S[j] of the array S related to first and second index variables i and j, outputs a key stream, based on a result of addition of the internal variable k and a reference result S[(S[i]+S[j])] of the array S according to S[i]+S[j], and updates the element S[(S[i]+S[j])] of the array S referred to in order to generate the key stream, using the array element S[i] and the internal variable k immediately, after output of the key stream.

20. The medium according to claim 12, which causes the computer to execute:

a first processing that, as an internal state used for generation of the pseudo-random number sequence, creates an initial state of the array S, by mixing elements of an array S by repeating permutation of and arithmetic addition of the elements of the array S, and, at this time, obtains an initial value of an internal variable k that is the temporary variable, from the elements of the array S; and a second processing that, when generating the pseudo-random number (referred below to as "key stream"), updates a value of the second index variable j, based on a result of an arithmetic addition of a value obtained by performing a first shift number of rotate shift operations on an array element S[i] of a first index variable i, and a second index variable j, updates a value of the internal variable k, based on a result of an arithmetic addition of a value obtained by performing a second shift number of rotate shift operations on an array element S[j] of a second index variable j, and an internal variable k, outputs a key stream, based on a result of an arithmetic addition of a value obtained by performing a third shift number of rotate shift operations on the array element S[(S[i]+S[j])] according to S[i]+S[j], and updates the array element S[(S[i]+S[j])] referred to in order to generate the key stream, using the array element S[i] and the internal variable k immediately after output of the key stream.

21. The medium according to claim 12, which causes the computer to execute:

a first processing that, using an initially set array a, performs permutation and mixing of the array a, obtains an internal variable k that is the temporary variable, by performing arithmetic addition of a corresponding array element a that has undergone a rotate shift operation, and obtains an array S as an internal state used for generation of the pseudo-random number sequence, by a prescribed operation on elements of the array a that have undergone a rotate shift operation and elements of the array S; and a second processing that, when generating the pseudo-random number (referred below to as "key stream"), performs an arithmetic addition of an internal variable k and a reference result S[j] of the array S related to first and second index variables i and j, outputs a key stream, based on the internal variable k and a reference result of the array S according to S[i]+S[j], and updates entries of S referred to in order to generate the key stream, using the internal variable k, immediately after output of the key stream.

22. A method of generating a pseudo-random number sequence using a computer, the method comprising:

using an internal state in accordance with a state based on a permutation of a sequence of a finite number of numeric values, as an internal state used for generation of the pseudo-random number sequence;

executing a predetermined leftward or rightward rotate shift, depending on a number smaller than an internal state number, based on the result of a linear operation or a non-linear operation, or a combination of a linear operation and a non-linear operation using one or more numeric values of the internal state;

setting at least one temporary variable used for generation of the pseudo-random number sequence to be a temporary variable having as a value a result of the execution of the predetermined leftward or rightward rotate shift; and generating the pseudo-random number by a predetermined prescribed operation on one or a plurality of numeric values of the internal state and the temporary variable.

* * * * *